United States Patent [19]

Halbich et al.

[11] 4,416,775
[45] Nov. 22, 1983

[54] IN-LINE FILTER AND CARTRIDGE THEREFOR

[75] Inventors: Frank Halbich, Granada Hills; Jeffrey L. Greene, New Hall, both of Calif.

[73] Assignee: STD Filter Company, Inc., Sylmar, Calif.

[21] Appl. No.: 330,094

[22] Filed: Dec. 14, 1981

[51] Int. Cl.³ ............................................. B01D 27/08
[52] U.S. Cl. ..................................... 210/236; 210/282
[58] Field of Search ................ 55/478, 480, 481, 512, 55/518, 519; 210/234, 236, 282, 447, 284

[56] References Cited

U.S. PATENT DOCUMENTS

| 565,972 | 8/1896 | Fowler | 210/447 |
|---|---|---|---|
| 3,529,726 | 9/1970 | Keenan | 210/282 |
| 3,830,042 | 8/1974 | MacDonnell | 55/480 |
| 4,025,426 | 5/1977 | Anderson et al. | 210/284 |

Primary Examiner—Ivars C. Cintins
Attorney, Agent, or Firm—Herzig & Walsh, Inc.

[57] ABSTRACT

A filter assembly or unit having end caps or fittings which are held together by tie rods with a filter casing between them and sealed to them. A filter cartridge is within the casing. Each end fitting or cap is constructed to provide a slideway to receive a sliding member that seals to the end fitting and which sealing engages an end of the filter casing. The sliding members can be secured to the end fittings. The sliding members along with the filter casing can be removed laterally from the assembly, the end fittings or caps remaining coupled in an air or gas line containing fluid to be filtered. In this manner the cartridge or cartridges can be replaced in the filter casing without uncoupling the end fittings from the an air or gas line and without disassembling the cage formed by the end fittings and the tie rods.

9 Claims, 7 Drawing Figures

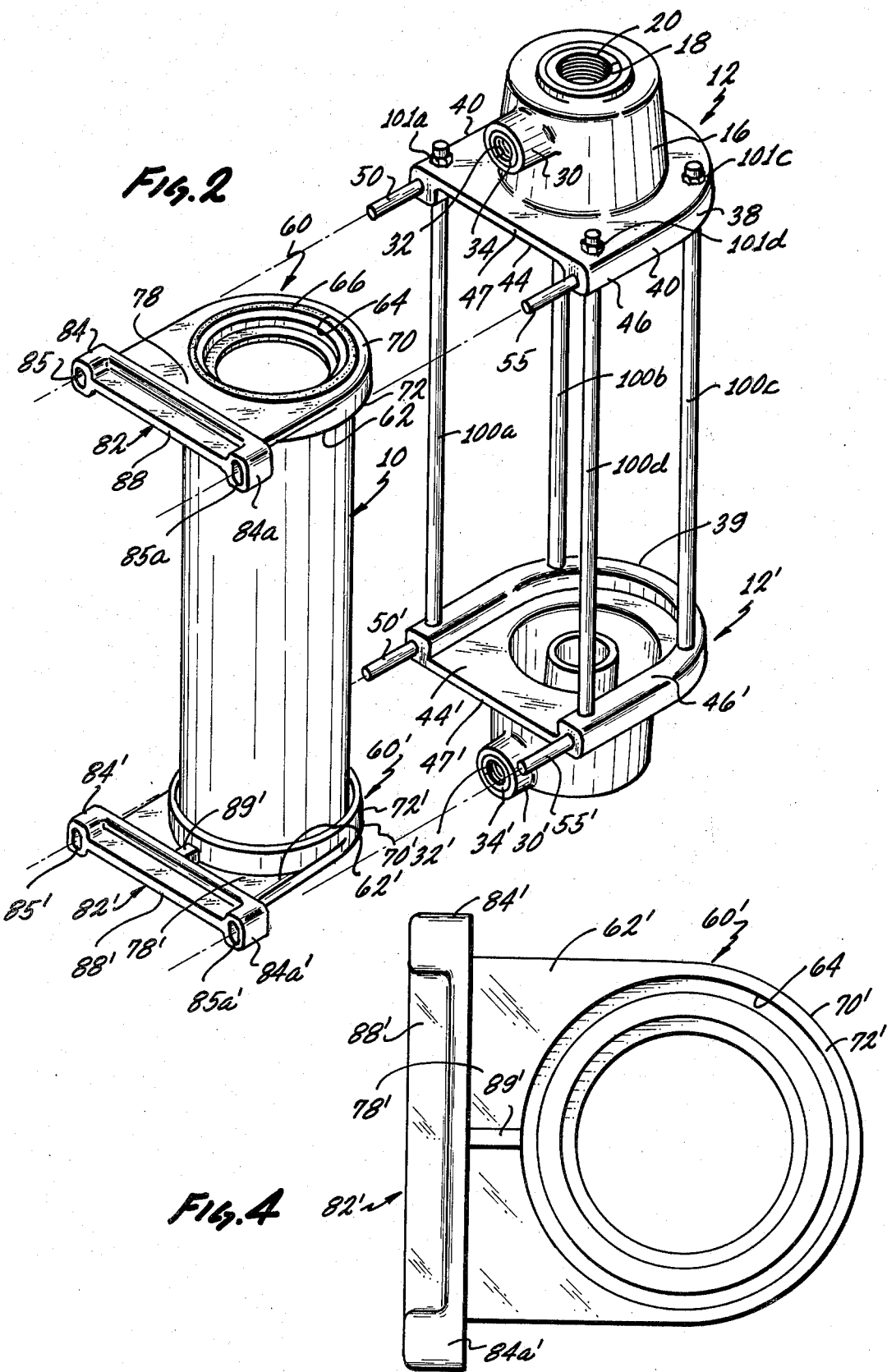

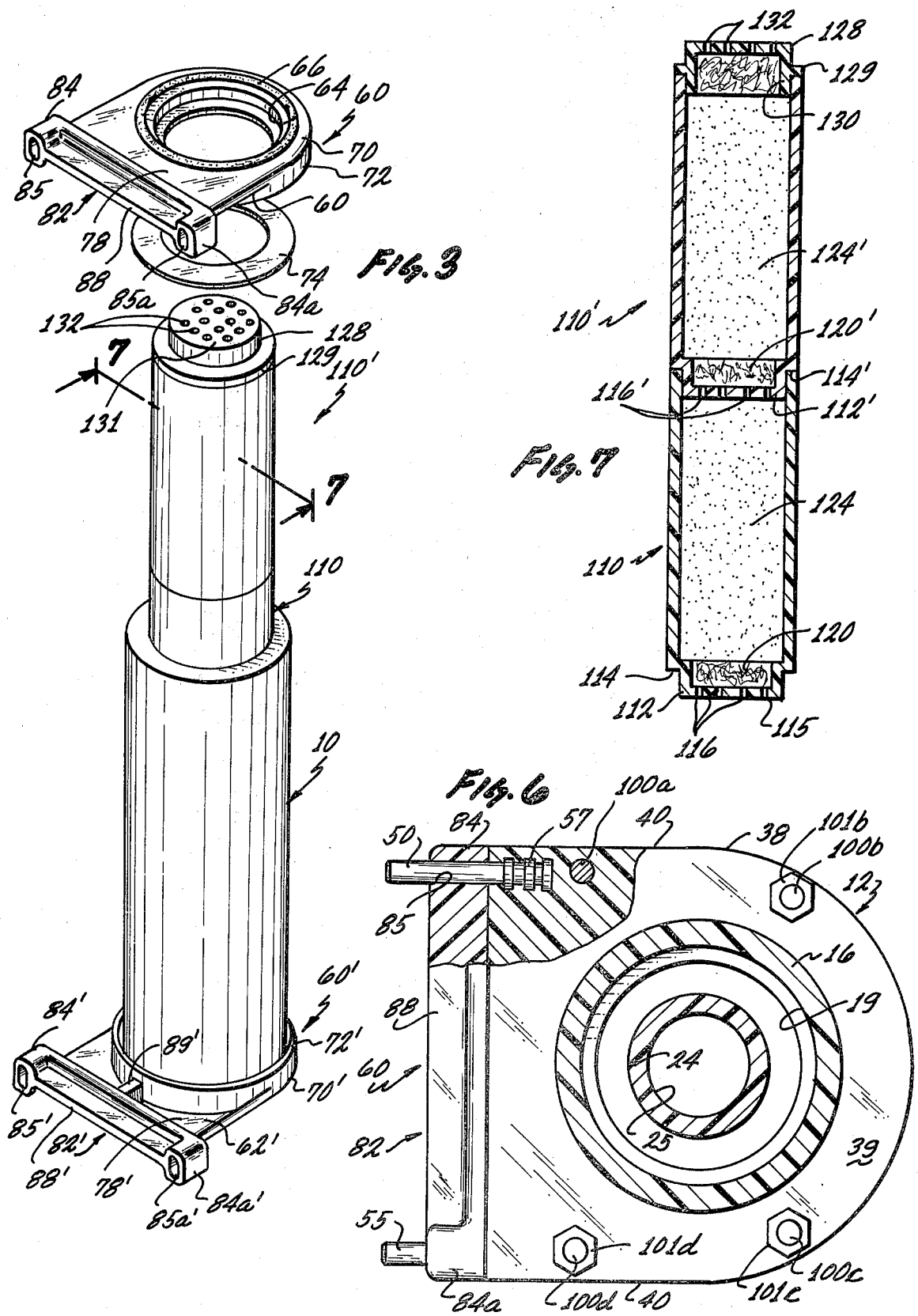

IN-LINE FILTER AND CARTRIDGE THEREFOR

BACKGROUND OF THE INVENTION

1. Field of the Invention

The field of the invention is that of in-line filters, that is, filters constructed to be coupled into an air or gas line for filtering. Generally these filters are of the type having a casing with end fittings which can be coupled into an air or gas line with a cartridge within the casing.

2. Description of the Prior Art

Filters of general or typical type as identified above, are well known in the art. Such filters normally include a cylindrical casing made of metal or other material with end fittings which can be coupled into an air or gas line, the end fittings being held together by holding rods having bolts or wing nuts at one end. These devices as known in the prior art are subject to significant disadvantages and drawbacks. Firstly, in order to replace the filter element or cartridge in the unit, the whole structure has to be disassembled, that is, it has to be uncoupled from the fluid line, the end fittings removed and then the cartridge taken out of the filter casing. This is, or course, a cumbersome and time consuming procedure, and, of course, leaves room for substantial improvement by way of a device that can eliminate the necessity.

A further area in which there was room for improvement in the prior art, resided in the use of a cartridge that is typically in the form of, for example, a couple of flexible bags containing the filter material, which might be comminuted clay material. Such bags had to be folded and creased in order to get them into the casing and then they had to be compressed together at the end for possibly about an inch in order to get them in, which became very difficult, time consuming and once they were in, the longitudinal crease in the bags tended to allow fluid to pass through the filter which remained contaminated. Thus, there has existed a need for an improved cartridge that could be more easily replaced in the filter, without folding and creasing and without degrading the capability of the filter to successfully filter the air or gas passing through it.

The herein invention, a preferred form of which is described in detail herein, is intended to overcome the above described drawbacks of the prior art as well as to provide additional capabilities and advantages.

SUMMARY OF THE INVENTION

The typical in-line filter unit as presently known in the prior art, has been identified and described generally in the foregoing.

In a preferred form of the herein invention, as described in detail hereinafter, it utilizes a casing for the filter cartridge or cartridges with a particular form of end fitting or cap at each end. Each end fitting is, of course, configurated to adapt it for coupling into an air or gas line.

In order to remove and replace a cartridge it is not necessary to remove the filter unit from the line or to disassemble it.

Each end fitting is provided with a slide member which slides into a way in the end fitting, the slide member having a surface forming a ramp which engages and seals to a complementary surface on the underside of the end fitting.

The end fitting has a base flange with one flat side surface and the slide member has a transverse part with a surface on the flange of the end fitting. Securing means are provided to secure the slide member and the end fitting together.

Each slide member on its opposite side has a configuration adapted to engage and fit against the end of the casing in sealing relationship.

The end fittings are held together in a conventional manner. To replace a filter cartridge the slides can simply be released from securement and slid out laterally with the casing and the cartridge within it. The cartridge can then be readily removed from the casing and replaced while the end fittings remain coupled in the an air or gas line.

In addition to the foregoing, an improved cartridge is provided. Preferably the cartridge is in the form of cylindrical sections and made of plastic material, each section containing the comminuted filtering material. Each section has a flanged end cap with a part having an external diameter corresponding to the internal diameter of the section, so that sections can be readily fitted together. Each end cap has perforations and a piece of holding material can be put into each end cap to prevent comminuted filtering material from escaping through the perforations. Sections can be fitted together as desired to accommodate to the length of the filter assembly.

In the light of the foregoing, the primary object of the invention is to make available a filter unit or filter assembly containing a replaceable filter cartridge so constructed that the filter cartridge can be replaced without breaking the connections of the filter unit in an air or gas line.

A further object is to realize a filter unit, as in the foregoing, so constructed that the filter casing and cartridge can be removed laterally from end fittings by which the filter unit is coupled into the air or gas line.

Another object is to realize a filter unit, as in the foregoing, having end fittings constructed to be coupled into a fluid line, the end fittings including members which are moveable laterally into sealing engagement with the end fittings and which also sealingly engage the ends of the filter casing so that the said members and the casing can be moved laterally from the assembly with the end fittings remaining coupled into an air or gas line.

A further object is to provide an improved filter cartridge constructed of plastic cylinders containing a comminuted filter material, the units having an end construction so that they can be joined together in multiples, corresponding to the length of a filter casing.

Further objects and additional advantages of the invention will become apparent from the following detailed description and annexed drawings.

BRIEF DESCRIPTION OF THE DRAWINGS

FIG. 2 is an exploded isometric view showing lateral removal of the filter casing, from the filter assembly;

FIG. 3 is an exploded isometric view of the filter casing illustrating the laterally moveable slide members;

FIG. 4 is a bottom view of the filter casing and an end member of FIG. 2;

FIG. 6 is a sectional view taken along the lines 6—6 of FIG. 5;

FIG. 7 is a sectional view of an improved form of filter cartridge.

DESCRIPTION OF THE PREFERRED EMBODIMENT AND BEST MODE OF PRACTICE

Referring to FIGS. 1-5 of the drawings these figures show a preferred exemplary form of the invention. As shown, the filter includes a cylindrical filter casing at 10, which is positioned between end fittings as identified at 12 and 12'. The two end fittings are alike and are constructed for coupling the filter unit into an air or gas line as will be described presently.

Figure 1:
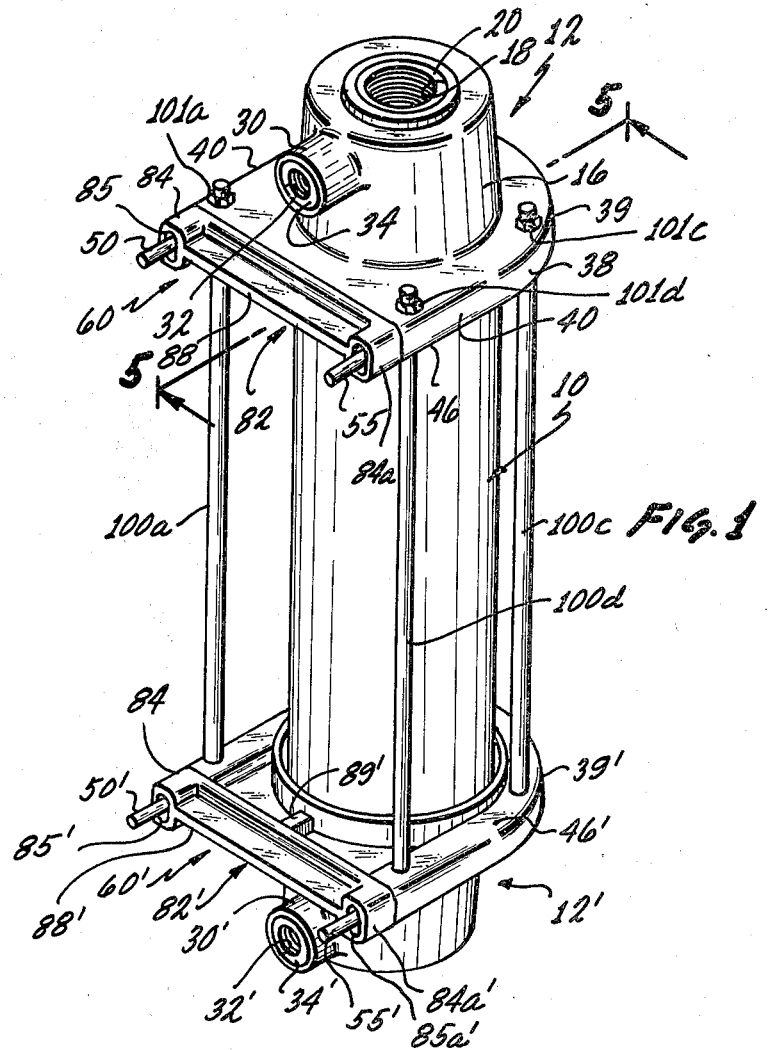
FIG. 1 is an isometric view of a preferred form of the filter unit of the invention.
Figure 5:
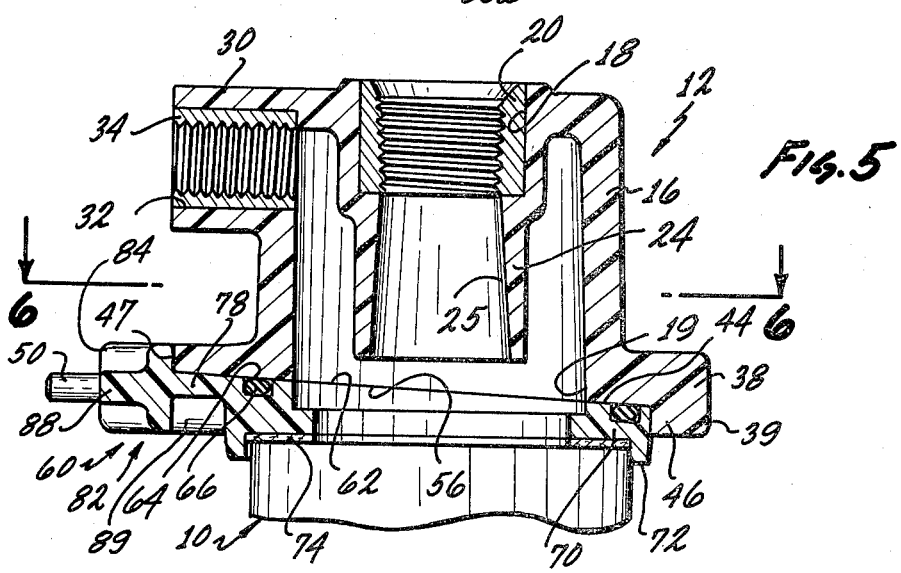
FIG. 5 is a sectional view taken along the line 5—5 of FIG. 1.

The end fitting or cap 12 is shown in cross-section in FIG. 5. It has a hollow cylindrical part 16 having a bore and a counter-bore 19 and in the end is a bore 18, in which is a threaded member 20 constructed so that a threaded coupling can be made to the fitting 12 to couple it into an air or gas line. The bore 18, is in the end of an inwardly extending cylindrical nipple member of part 24 which has a tapered bore 25 extending from the bottom of the bore 18.

Extending from the side of the fitting 12 is a boss 30 having a bore 32 with a threaded member 34 having a bore 32. The purpose of this bore and the threaded member 34 is to provide an adapter for coupling a pressure gauge to the fitting.

At the lower part of the fitting 12 there is formed a base or flange part 38 which is rounded at the back as shown at 39 and it has flat sides as may be seen at 40.

Formed in the underside of the base part 38 of the fitting 12 is a recess which forms a slideway as designated at 44, the perpheral part of the base 38 around the slideway 44 forming a rib as shown at 46. The side of the base part 38 in which the entrance to the slideway 44 is formed provides a flat surface as designated at 47, this surface including end parts of the rib 46. Extending from the ends of the rib 46 are pins 50 and 55 which have a purpose as will be referred to presently. The ends of the pins 50 and 55 are flanged and are embedded in the material of flange 38 which may be made of plastic, as shown at 57.

The upper flat surface of the slide way 44, that is, the bottom of the fitting 12 inside of the rib 46 is on a slant forming a ramp as identified at 56, in FIG. 5.

Numeral 60 designates a slide member or slide fitting which is configurated to slide into the slideway as indicated at 44, the slide member having a slanting top surface as designated by 62 configurated to conform to the ramp 56 on the bottom side of the fitting 12, these parts coming together as shown in FIG. 5. The ramp surface 62 of the slide fitting 60 has an annular groove in it as designated at 64, which receives a sealing ring 66 which seals to the surface on the underside of the fitting 12.

The slide member 60 has a circular or cylindrical part as designated at 70 which includes a downwardly extending circular flange 72 which is of a size to engage the upper end of the casing 10 and is sealed to it by a gasket 74.

At one side the slide fitting or member 60 it has an extending web as designated at 78 this web terminating in a transverse rib member or part 82. The rib 82 has a configuration as may be seen in FIGS. 2 and 5 having enlarged end parts 84 and 84a having apertures 85 and 85a to be received on the stems 50 and 55, which preferably can be threaded to receive wing nuts as will be described. The intermediate part of the rib 82 is narrowed in thickness so as to form a web as designated at 88.

At the opposite end of the casing 10 there is a similar end fitting 12' and since it is of the same construction it need not be described in detail. At the opposite end of the casing 10 another slide member or unit like the member 60 is provided as designated at 60'. It engages the other end of the casing 10 in the same manner as the slide member 60. FIG. 4 is a top view of the slide member 60'. A web 89' is between flange 72' and part 82'.

The slide member 60' engages and is sealed to the bottom end of the casing 10 in the same manner as the other slide member 60. Slide member 60' can slide and fit into way 44' in the end fitting 12' the same as described in connection with the slide 60 and the way 44 in the top end fitting 12.

In the utilization of the invention the slide members 60 and 60' are associated with the casing 10 with a cartridge in it, as illustrated in FIG. 3 so that this assembly as a whole can be inserted into the unit as illustrated in FIG. 2. The two end fittings 12 and 12' are held in spaced relationship by rods 100a, 100b, 100c, and 100d, which extend between the ribs 46 and 46' on the end fittings with nuts at the ends of the rods, as shown at 101a, 101c, and 101d. When the end fittings and the casing 10 are assembled into the cage formed by the end fittings 12 and 12' and the rods extending between them, the sealing ramps on the slide members come into sealing engagement with the complementary surfaces on the end fittings 12 and 12' as previously described.

From the foregoing the unique advantages of the invention are apparent. The filter unit, that is, the casing 10 with the cartridges in place, forming the assembly as shown in FIG. 2 with end fittings 12 and 12' are, of course, coupled into the fluid line of the fluid that is to be filtered. In order to replace a filter cartridge the slide members 60 and 60' need only to be unsecured from flanges 38 and 38' and then the casing 10 and the slide members 60 and 60' can just be moved out laterally, as shown in FIG. 2 while the end fittings 12 and 12' remain coupled into the line. There is no need to uncouple them. It is only necessary then to remove one of the slide members from the casing 10 and the filter cartridge in the casing 10 can be replaced. The disassembly is illustrated in FIG. 3.

FIG. 3 shows one of the slide members 60 removed from the end of the casing 10, the gasket member 74 being shown as well. FIGS. 3 and 7 illustrates a novel form of the cartridge unit, which has unique advantages as compared to conventional cartridge members as described in the foregoing. The preferred form of the cartridge as illustrated in FIG. 7 is in the form of a tubular container which preferably can be made of plastic, the unit being designated by the numeral 110. One end of the unit is smaller as shown at 112, with a square shoulder 114 in between the parts of different diameters. The end 115 of the part 112 of smaller diameter has perforations in it as shown at 116 to allow the flow of air or gas to be filtered. Positioned in the end part of the unit is cotton or other fabric material as designated at 120, which prevents the filter material form coming out through the perforations. Preferably the filter material as designated at 124 is a solid comminuted material which conventionally may be a clay material.

Numeral 110' designates another filter unit which is like the one just described; it has an end part 112' which can be fitted into the end of the unit 110 with its shoulder 114' coming flush against the unit 110. At the other end of the unit 110' is a cylindrical end cap 128 having a flange 129 and a circular part 130, which fits into the end of the unit 110'. The opposite end of the cap 128 is closed as shown at 131 with this end having perforation 132 in it and material similar to the material 120 can be used within the end cap to prevent the comminuted filtering material from escaping.

FIG. 3 illustrates two of the filter units shown in FIG. 7 assembled in the casing 10 between two of the slide members 60 and 60'.

From the foregoing those skilled in the art will readily understand the nature and characteristics of the invention and the manner in which it achieves the objectives as set forth in the foregoing. The unique advantage provided by the invention is that it eliminates the need which was characteristic of the prior art that in order to replace a filter cartridge the filter unit had to be completely uncoupled from the air or gas line and taken out of the line, and then it had to be disassembled in order to remove the casing from the end fittings and the cartridge would be removed from the casing. The herein invention mades it possible to simply slide the casing and the cartridge units with the slide members laterally out of the cage assembly formed by the end fittings and the holding rods between them. It is not necessary to uncouple the end fittings from the air or gas line or disassemble the cage formed by the end fittings and the holding rods.

The novel cartridge as described in the foregoing eliminates all of the disadvantages of the conventional filter cartridges as known and provides a simplified form of the cartridge which is inexpensive, very easy to handle, and which facilitates joining together multiple cartridge units.

The foregoing disclosure is representative of a preferred form of the invention and is to be interpreted in an illustrative rather than a limiting sense the invention to be accorded the full scope of the claims appended hereto.

We claim:

1. A filter assembly comprising in combination a casing having ends and containing a filter cartridge, an end fitting at each end of the casing, means holding the end fittings together including holding rods extending between the end fittings, each end fitting including a laterally moveable slide member having a surface formed for sealing engagement with a surface of the end fitting and having an opposite side conformed for sealing engagement with the end of the said casing, and means whereby the slide members with the casing and cartridge can be removed from the unit without breaking connections to the end fittings the slide members remaining sealed to the ends of the casing.

2. An article as in claim 1 wherein each end fitting is constructed whereby it can be coupled into an air or gas line.

3. An article as in claim 2 wherein each end fitting has a threaded axial bore for coupling into an air or gas line.

4. An article as in claim 1 wherein each end fitting has a base part having a portion forming a joining surface, each slide having a part including a complementary surface to the said surface on said base and means securing the said slide to the base of the end fitting.

5. An article as in claim 1 including securing means having stems extending from the base of each end fitting, the said slides having openings to receive the said stems.

6. A filter assembly comprising in combination, a casing having ends and containing a filter cartridge, an end fitting at each end of the casing, means holding the end fittings together including holding rods extending between the end fittings, each end fitting including a laterally moveable slide member having a surface formed for sealing engagement with the surface of the end fitting and having an opposite side conformed formed for sealing engagement with the end of the said casing and means whereby the slide members with the casing and cartridge can be removed from the unit without breaking connections to the end fittings, the said surface on the slide member forms a ramp the end fitting having a complementary surface to be engaged by the ramp.

7. An article as in claim 6 including sealing means interposed between the ramp surface and the complementary surface on the end fitting.

8. An article as in claim 6 wherein each of the slide members has a flange on the side opposite the ramp of a size to interengage and receive the end of the said casing.

9. A filter assembly comprising in combination, a casing having ends and containing a filter cartridge, an end fitting at each end of the casing, means holding the end fittings together including holding rods extending between the end fittings, each fitting including a laterally moveable slide member having a surface formed for sealing engagement with a surface of the end fitting and having an opposite side conformed for sealing engagement with the end of said casing and means whereby the slide members with the casing and cartridge can be removed from the unit without breaking connections to the end fittings, each end fitting having a base part having a portion forming a joining surface, each slide having a part including a complementary surface on the said surface on said base and means securing the said slide to the base of the end fitting, the base part of the end fitting is in the form of a flange, the joining surface being formed by a flat side of the said flange the said slide having a rib with said complementary joining surface formed on it.

* * * * *